United States Patent
Clemente

[11] Patent Number: 6,092,927
[45] Date of Patent: Jul. 25, 2000

[54] TEMPERATURE DETECTION OF POWER SEMICONDUCTORS PERFORMED BY A CO-PACKAGED ANALOG INTEGRATED CIRCUIT

[75] Inventor: Stefano Clemente, Rolling Hills Estate, Calif.

[73] Assignee: International Rectifier Corp., El Segundo, Calif.

[21] Appl. No.: 08/337,550

[22] Filed: Nov. 10, 1994

[51] Int. Cl.[7] ............................. G01K 7/00; G01N 25/20
[52] U.S. Cl. ........................... 374/163; 374/43; 374/134; 374/178
[58] Field of Search ............................ 374/43, 110, 134, 374/141, 163, 166, 178; 364/557; 257/467

[56] References Cited

U.S. PATENT DOCUMENTS

| | | | |
|---|---|---|---|
| 3,566,690 | 3/1971 | Ebrahimi | 374/178 |
| 3,745,460 | 7/1973 | Belzer et al. | 374/43 X |
| 4,001,649 | 1/1977 | Young | 374/110 X |
| 4,138,878 | 2/1979 | Holmes et al. | 374/43 X |
| 4,330,809 | 5/1982 | Stanley | 374/134 X |
| 4,760,434 | 7/1988 | Tsuzuki et al. | 257/49 |
| 4,786,826 | 11/1988 | Clemente | 327/541 |
| 4,896,199 | 1/1990 | Tsuzuki et al. | 257/49 |
| 4,918,505 | 4/1990 | Blouke et al. | 257/244 |
| 4,931,844 | 6/1990 | Zommer | 257/48 |
| 5,049,961 | 9/1991 | Zommer et al. | 257/470 |
| 5,063,307 | 11/1991 | Zommer | 327/512 |
| 5,064,141 | 11/1991 | Nesline, Jr. | 244/3.15 |
| 5,153,452 | 10/1992 | Iwamura et al. | 327/541 |
| 5,237,481 | 8/1993 | Soo et al. | 361/103 |

*Primary Examiner*—Harshad Patel
*Attorney, Agent, or Firm*—Ostrolenk, Faber, Gerb & Soffen, LLP

[57] ABSTRACT

A method and apparatus for determining the temperature of a discrete power semiconductor from an analog integrated circuit that is copackaged with the power semiconductor on a heat sink, given a knowledge of the thermal capacitances of the power semiconductor and of the analog integrated circuit, the thermal resistance between the power semiconductor and the analog integrated circuit, the thermal resistances between the power semiconductor and the heat sink and between the analog integrated circuit and the heat sink. The method includes determining the voltage across the power semiconductor and the current through the power semiconductor, thereby determining the power dissipated in the power semiconductor, determining the temperature of the analog integrated circuit, determining the heat sink temperature, using the thermal capacitances, heat sink temperature and thermal resistances to set coefficients of an asymptotic observer system, providing the voltage and current and the temperature of the analog integrated circuit to the asymptotic observer system, and providing as an output from the asymptotic observer system the temperature of the discrete power semiconductor.

19 Claims, 3 Drawing Sheets

INFINITE HEATSINK OR AMBIENT

TEMPERATURE DETECTION OF POWER SEMICONDUCTORS PERFORMED BY A CO-PACKAGED ANALOG INTEGRATED CIRCUIT

BACKGROUND OF THE INVENTION

In spite of continuous advances in the level of monolithic integration of power functions, a discrete power semiconductor co-packaged with one or more integrated circuits to perform the functions of drive, protection and control provides in many applications a more economical and a better performance solution than a totally integrated one.

This is particularly true when the function to be integrated requires blocking voltages and current levels that are at the limits of the state of the art. Voltage requirements close to the limits of the state of the art add complexity to the process, while large currents require large silicon areas. Either of these requirements has a significant impact on the cost of the integrated solution.

Co-packaging a power semiconductor die with a separate analog and/or digital integrated circuit is an alternative solution that allows more flexibility in the choice of the type of device and process. By way of example, the power device can be implemented with a vertical geometry and specific process techniques that maximize ruggedness, reliability and silicon utilization. The signal processing integrated circuit, on the other hand, could be implemented in low voltage, high density technologies aiming at low cost or high performance or speedy customization or other appealing feature. As a result, cost and performance of the combination can be closely optimized for the specific application. Monolithic implementation cannot provide this level of flexibility and versatility with the available technology.

One major disadvantage of the co-packaged solution is the fact that, by separating the control and protection functions from the power device, one key parameter of its operation, namely temperature, is not immediately available to the control and protection circuitry. A simple and fundamental operation, like overtemperature protection of the power device, cannot be accurately and economically performed if the temperature sensing circuitry is mounted at some distance from the power device or, as it is frequently the case, if they are mounted on a common substrate with relatively high thermal resistance.

As shown later, under the narrow assumption of steady state operating conditions, the overtemperature protection circuitry on the analog integrated circuit could determine the temperature on the power device if the thermal resistance of the two dice between themselves and to the ambient is known, together with the instantaneous power dissipated into the power device itself and the temperature of the analog integrated circuit.

However, overtemperature protection is most useful under fault or other transient conditions, which cause rapid temperature rises. Under these conditions, the knowledge of the parameters mentioned in the previous paragraph is not sufficient to establish the instantaneous temperature of the power device because of the thermal capacitances present.

SUMMARY OF THE INVENTION

The purpose of this invention is to provide a way to determine accurately the temperature of a discrete power semiconductor from an analog integrated circuit that is copackaged with the power semiconductor in a "known" fashion ("known" means that a number of thermal parameters are known, as described later). This temperature is determined under transient, as well as steady state conditions with no information related to the operation of the power semiconductor other than the current through it and the voltage drop across its terminals.

The availability of temperature information, alone or combined with the instantaneous power dissipation, allows the implementation of sophisticated protection techniques into complex functions (like modern power modules) to achieve substantially higher levels of operational reliability. By way of example, a current protection, normally set at a fixed level, could be made a function of the actual die temperature and power dissipation. An overtemperature shutdown, normally set at a particular die temperature, could be lowered as a function of its rate of rise. This adaptive approach to system monitoring and protection would indirectly take advantage of—or compensate for—tolerances in the manufacturing process, i.e. lower power losses in a better than average power device. To the extent that they affect the operating temperature of the control IC, the system will also compensate for degraded thermal resistances over time.

All this can be done if the temperature of the power device is known. The following describes in detail how to establish this temperature in a copackaged arrangement.

The above and other objects of the invention are achieved by a method for determining the temperature of a discrete power semiconductor from an analog integrated circuit that is copackaged with the power semiconductor on a heat sink, given a knowledge of the thermal capacitance of the power semiconductor and of the analog integrated circuit and the thermal resistance between the power semiconductor and the analog integrated circuit, the thermal resistance between the power semiconductor and the heat sink and the thermal resistance between the analog integrated circuit and the heat sink, the method comprising:

determining the voltage across the power semiconductor and the current through the power semiconductor, thereby determining the power dissipated in the power semiconductor;

determining the temperature of the analog integrated circuit;

determining the heat sink temperature;

using said thermal capacitances, heat sink temperature and thermal resistances to set coefficients of an asymptotic observer system;

providing said voltage and current and the temperature of the analog integrated circuit to the asymptotic observer system; and providing as an output from said asymptotic observer system said temperature of the discrete power semiconductor.

The above and other objects of the invention are also achieved by apparatus for determining the temperature of a discrete power semiconductor from an analog integrated circuit that is copackaged with the power semiconductor on a heat sink, given knowledge of thermal capacitances of the power semiconductor and of the analog integrated circuit, heat sink temperature, thermal resistance between the power semiconductor and the analog integrated circuit, thermal resistance between the power semiconductor and the heat sink and thermal resistance between the analog integrated circuit and the heat sink, the apparatus comprising:

a circuit having as inputs the voltage across the power semiconductor and the current through the power semiconductor and determining the power dissipated in the power semiconductor;

a circuit for determining the temperature of the analog integrated circuit; and an asymptotic observer system having coefficients formed from said thermal capacitances, heat sink temperature and thermal resistances;

said asymptotic observer system having as inputs said voltage and current and the temperature of the analog integrated circuit and having as an output said temperature of the discrete power semiconductor.

In a steady state condition, where the temperatures are not changing, the objects of the invention are achieved by a method for determining the steady state temperature of a discrete power semiconductor from an analog integrated circuit that is copackaged with the power semiconductor on a heat sink, given a knowledge of the thermal resistance between the power semiconductor and the analog integrated circuit, the thermal resistance between the power semiconductor and the heat sink and the thermal resistance between the analog integrated circuit and the heat sink, the method comprising:

determining the voltage across the power semiconductor and the current through the power semiconductor, thereby determining the power dissipated in the power semiconductor;

determining the temperature of the analog integrated circuit;

determining the heat sink temperature; and using said heat sink temperature, power, temperature of the analog integrated circuit and thermal resistances to determine the temperature of the discrete power semiconductor.

Also in the steady state condition, the objects of the invention are achieved by an apparatus for determining the steady state temperature of a discrete power semiconductor from an analog integrated circuit that is copackaged with the power semiconductor on a heat sink, given knowledge of heat sink temperature and thermal resistance between the power semiconductor and the analog integrated circuit, thermal resistance between the power semiconductor and the heat sink and thermal resistance between the analog integrated circuit and the heat sink, the apparatus comprising:

a circuit having as inputs the voltage across the power semiconductor and the current through the power semiconductor and determining the power dissipated in the power semiconductor;

a circuit for determining the temperature of the analog integrated circuit; and a circuit using said heat sink temperature, power, temperature of the analog integrated circuit and thermal resistances to calculate as an output, the temperature of the discrete power semiconductor.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings, in which.

DETAILED DESCRIPTION OF EMBODIMENTS OF THE INVENTION

Figure 1:
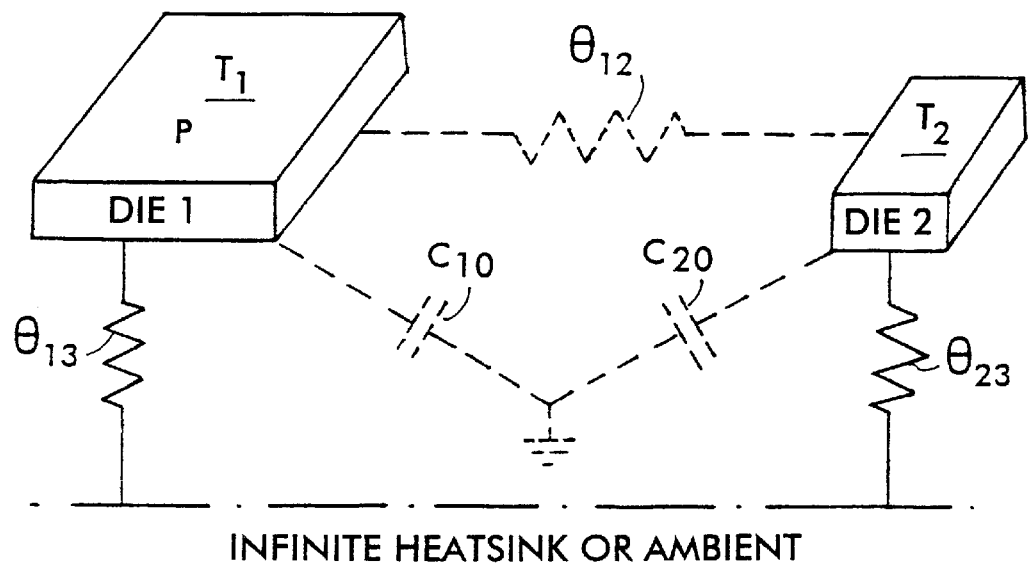
FIG. 1 shows a schematic representation of two co-packaged dice with an indication of the thermal parameters associated therewith.
Figure 2:
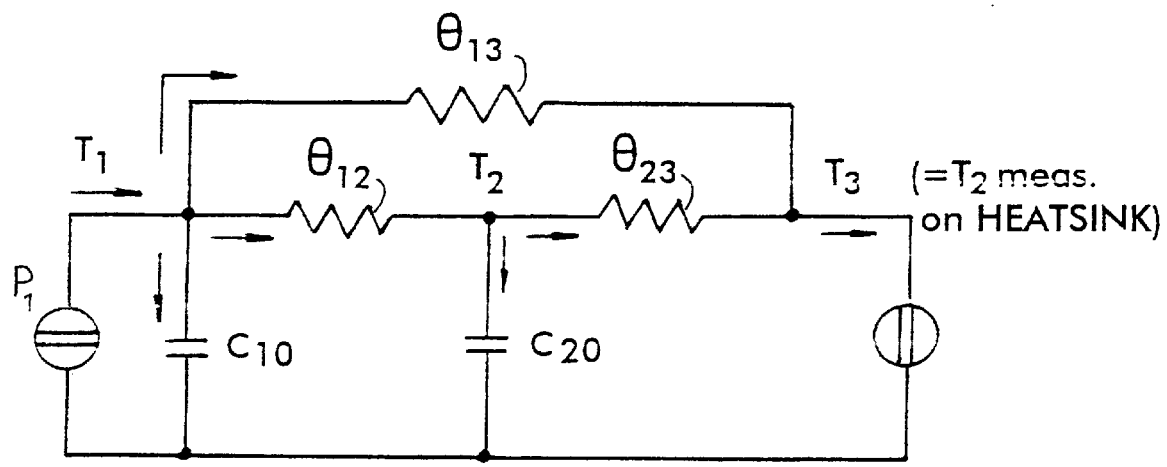
FIG. 2 shows a thermal model of the packaging arrangement shown in FIG. 1.

FIG. 1 shows a simple representation of two co-packaged dice with an indication of the thermal parameters associated therewith. Die 1 is the power die and die 2 is the analog control die. FIG. 2 shows a thermal model of the packaging arrangement shown in FIG. 1 derived from the following electrical analogy: Thermal resistance is equivalent to electrical resistance; Thermal capacitance is equivalent to electrical capacitance; A source dissipating power is equivalent to a current generator; Temperature between two points is equivalent to voltage differential.

In FIG. 1, T=temperature; P=power generated in Die 1; $\theta$=thermal resistance; and C=thermal capacitance.

More complex models can be devised to achieve higher accuracy or to represent sophisticated hybrid packages. Additional thermal resistances and capacitances and corresponding intermediate temperatures may be appropriate in many cases. In general, a network with distributed constants is more representative of the real thermal system. However, the illustrated model was chosen as the simplest meaningful representation that allows a complete embodiment of the concept.

The equations governing the circuit in FIG. 2 are shown below:

$$\dot{T}_2 = -\frac{1}{c_{20}}\left(\frac{1}{\theta_{12}} + \frac{1}{\theta_{23}}\right)T_2 + \frac{1}{c_{20}\theta_{12}}T_1 + \frac{1}{c_{20}\theta_{23}}T_3 \quad (1)$$

$$\dot{T}_1 = \frac{1}{c_{10}\theta_{12}}T_2 - \frac{1}{c_{1\theta}}\left(\frac{1}{\theta_{12}} + \frac{1}{\theta_{13}}\right)T_1 + \frac{1}{c_{10}\theta_{13}}T_3 + \frac{1}{c_{10}}P_1$$

$$\dot{T}_3 = 0$$

This can be rewritten as:

$$\begin{bmatrix}\dot{T}_2 \\ \dot{T}_1 \\ \dot{T}_3\end{bmatrix} = \begin{bmatrix}a_{11} & a_{12} & a_{13} \\ a_{21} & a_{22} & a_{23} \\ 0 & 0 & 0\end{bmatrix}\begin{bmatrix}T_2 \\ T_1 \\ T_3\end{bmatrix} + \begin{bmatrix}0 \\ b \\ 0\end{bmatrix}P_1$$

Where $$a_{11} = -\frac{1}{c_{20}}\left(\frac{1}{\theta_{12}} + \frac{1}{\theta_{23}}\right); a_{12} = \frac{1}{c_{20}\theta_{12}}; a_{13} = \frac{1}{c_{20}\theta_{23}};$$

$$a_{21} = \frac{1}{c_{10}\theta_{12}}; a_{22} = -\frac{1}{c_{10}}\left(\frac{1}{\theta_{12}} + \frac{1}{\theta_{13}}\right); a_{23} = \frac{1}{c_{10}\theta_{13}};$$

$$b = \frac{1}{c_{10}};$$

and

| | |
|---|---|
| $\theta_{ij}$ = Thermal resistance | i, j = 1 die 1 |
| | 2 die 2 |
| | 3 heat sink |
| $C_{io}$ = Thermal capacitance | i = 1 die 1 |
| | 2 die 2 |
| $T_i$ = Absolute temperature | i = 1 die 1 |
| | 2 die 2 |
| | 3 heat sink |
| $P_1$ = Power dissipated in die 1 | |

The equations above governing the circuit in FIG. 2 are stated in terms of the following parameters and operational data:

i. thermal resistance $\Theta$ between each die and the heat sink (or ambient) and between the two dice (i.e., $\theta_{13}$= thermal resistance between die 1 and heat sink or ambient)

ii. thermal capacitance $C_{10}$ and $C_{20}$ of the two dice;

iii. temperature $T_2$ of the analog IC and its time derivative $\dot{T}_2$;

iv. instantaneous power dissipation $P_1$ in the power device;

v. heat sink (or ambient) temperature $T_3$, whose derivative $\dot{T}_3$ has been assumed equal to zero;

vi. temperature $T_1$ of the power die and its derivative $\dot{T}_1$.

The parameters in i. and ii. above are generally known or can be determined with well established measurement methods from sample units representative of the co-packaged configuration.

The temperature $T_2$ of the analog integrated circuit (item iii.) must be generated by a suitable circuit that is part of the analog integrated circuit itself. Several techniques are widely utilized to perform this function, commonly known as PTAT circuits (Proportional To Absolute Temperature) that make use of bandgap reference circuits. Its time derivative $\dot{T}_2$ can also be generated by well established techniques, typically an RC circuit in combination with an operational amplifier. However, as will appear below, the value of the derivative, $\dot{T}_2$, is not required to determine the temperature of the power die.

The power dissipation $P_1$ in the power semiconductor (item iv.) is the product of the voltage drop across the terminals of the power device and the current that flows into it. The voltage is readily available within the package itself, while a signal proportional to current can be generated in a number of ways, the most common being a shunt resistor or die partitioning. In many cases a current signal is already available as part of the basic control functions. Simple multiplying circuits are also well known, the simplest being a variable transconductance multiplier.

As will be shown below, the heat sink (or ambient) temperature $T_3$ will not be necessary as it is implied in the measured temperature $T_2$.

Note that the steady state case mentioned previously can be derived from the equations above by equating the derivatives of the temperatures ($\dot{T}$) to zero. In equating the derivatives of the temperature to 0, the thermal capacitances are also cancelled from the equation. The state equations then become simple algebraic relations with two unknowns, $T_1$ and $P_1$, that allow calculation of the temperature of the power die, knowing the temperature of the control die $T_2$, the thermal resistance and $T_3$.

The steady state equations are as follows:

$$T_1 = \left(1 + \frac{\theta_{12}}{\theta_{23}}\right)T_2 - \frac{\theta_{12}}{\theta_{23}}T_3$$

$$T_1 = \frac{\theta_{13}}{\theta_{13}+\theta_{12}}T_2 + \frac{\theta_{12}}{\theta_{13}+\theta_{12}}T_3 + \frac{\theta_{12}\theta_{13}}{\theta_{13}+\theta_{12}}P_1$$

These can easily be solved for $T_1$, given $P_1$, known thermal resistance parameters, known or measured $T_3$ and measured $T_2$.

In the non-steady state case, to determine the critical parameter, the temperature $T_1$ of the power device (item vi.), an "asymptotic observer system" has to be defined and implemented.

Figure 3:
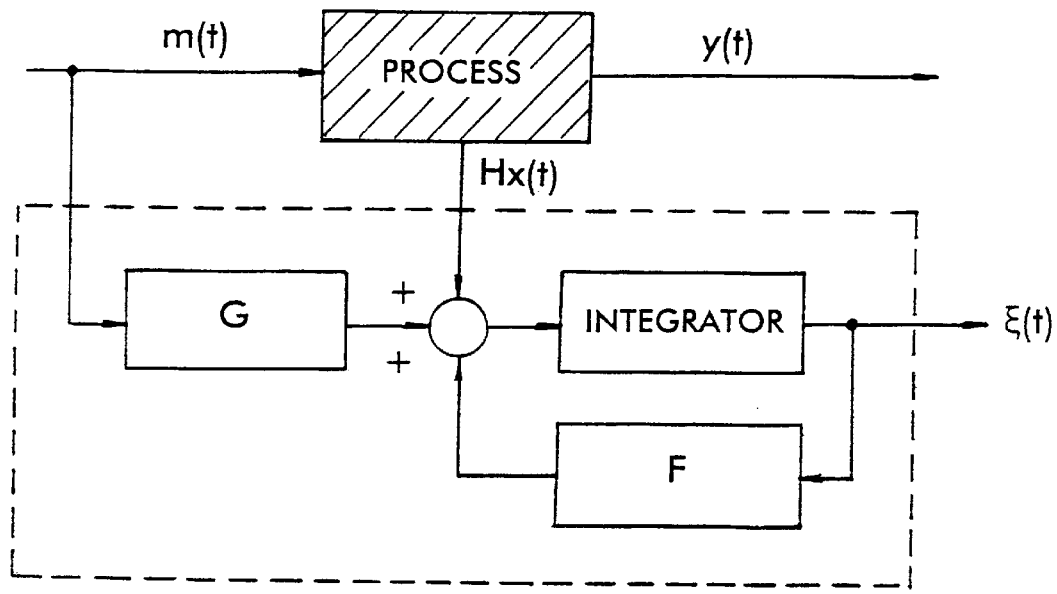
FIG. 3 shows the block diagram of an asymptotic observer system.

The function of an asymptotic observer system is to elaborate an estimate of the state of a process from measurements made on the input, output or other elements related to the process (FIG. 3). In the specific case, the process is the one represented in FIG. 1 and the observer system that performs the function of establishing the temperature of the power die is shown in FIG. 3. The equations needed to define and implement it are as follows:

$$\begin{bmatrix}\dot{Z}_1\\\dot{Z}_2\end{bmatrix} = \begin{bmatrix}f_{11} & f_{12}\\f_{21} & f_{22}\end{bmatrix}\begin{bmatrix}Z_1\\Z_2\end{bmatrix} + \begin{bmatrix}h_1\\h_2\end{bmatrix}T_2 + \begin{bmatrix}b\\o\end{bmatrix}P_1 \quad\quad 2(a)$$

$$T_1^* = Z_1 + k\,T_2 \quad\quad (2)(b)$$

where equation 2(a) can be rewritten in vectorial notation, as:

$$\dot{Z}=\underline{F}Z+\underline{H}T_2+\underline{G}P_1 \quad\quad (3)$$

Figure 4:
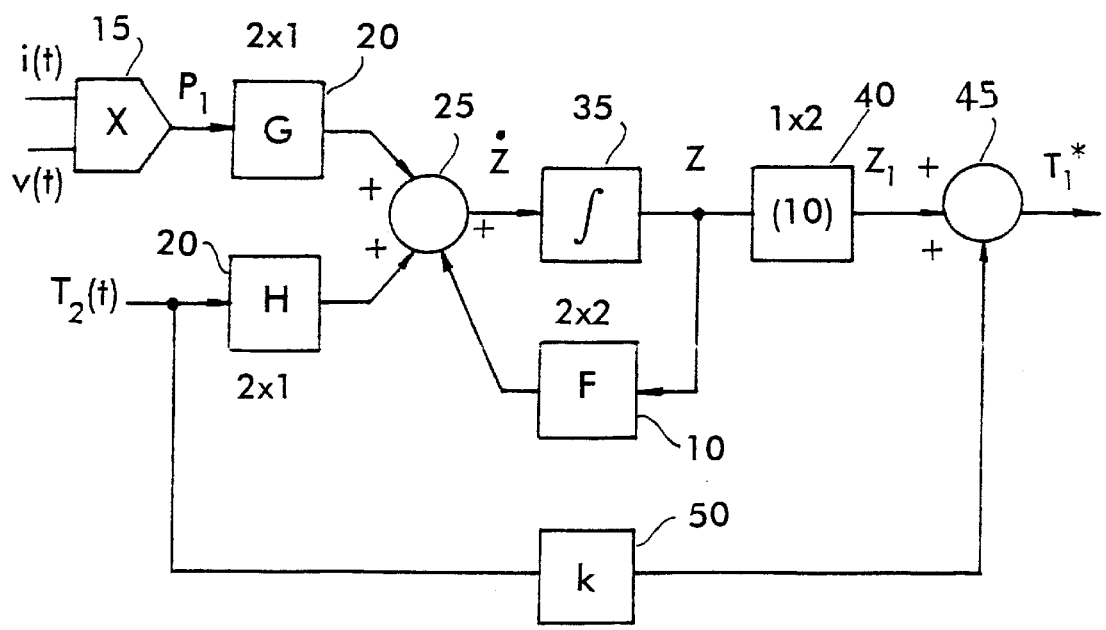
FIG. 4 shows an asymptotic observer system for the arrangement shown in FIG. 1.

The relationships expressed by equations 2 can be visualized with the help of the block diagram of FIG. 4.

As shown in the block diagram of FIG. 4, the observer system takes as inputs the voltage v(t) and current i(t) in the power die, in addition to the temperature $T_2$(t) of the control die, generated within the control die itself. It gives as output a value $T_1^*$(t) that converges to $T_1$(t) (temperature of the power die) at a rate that is determined by the choice of the parameters $f_{ij}$ and $h_{ij}$ which are determined by the known parameters (thermal resistances, thermal capacitances and heat sink (or ambient) temperature). The theory of asymptotic observer systems is well developed and provides the necessary tools for the proper selection of these parameters in a specific application.

As shown in FIG. 4, blocks 10, 20 and 30 are multipliers implementing the factors F (a 2×2 matrix), G (a 2×1 matrix) and H (a 2×1 matrix), as shown by, equations 2 (a) and (3) above.

A multiplier 15, e.g., a variable transconductance amplifier, forms the instantaneous power of the power semiconductor from the voltage v(t) and current i(t). A summer 25 forms the sum $\dot{Z}=FZ+HT_2+GP_1$ (equation 3) where Z is the output of integrator 35. After scaling by a 1×2 matrix at 40 to form $Z_1$, the sum $T_1^*=Z_1+KT_2$ is formed by summer 45 from the inputs $Z_1$ and $KT_2$, the latter formed by the scaler 50 having $T_2$ as an input. The matrix coefficients of equation 2(a) are formed from the thermal parameters defined in equations (1) above.

Figure 5:
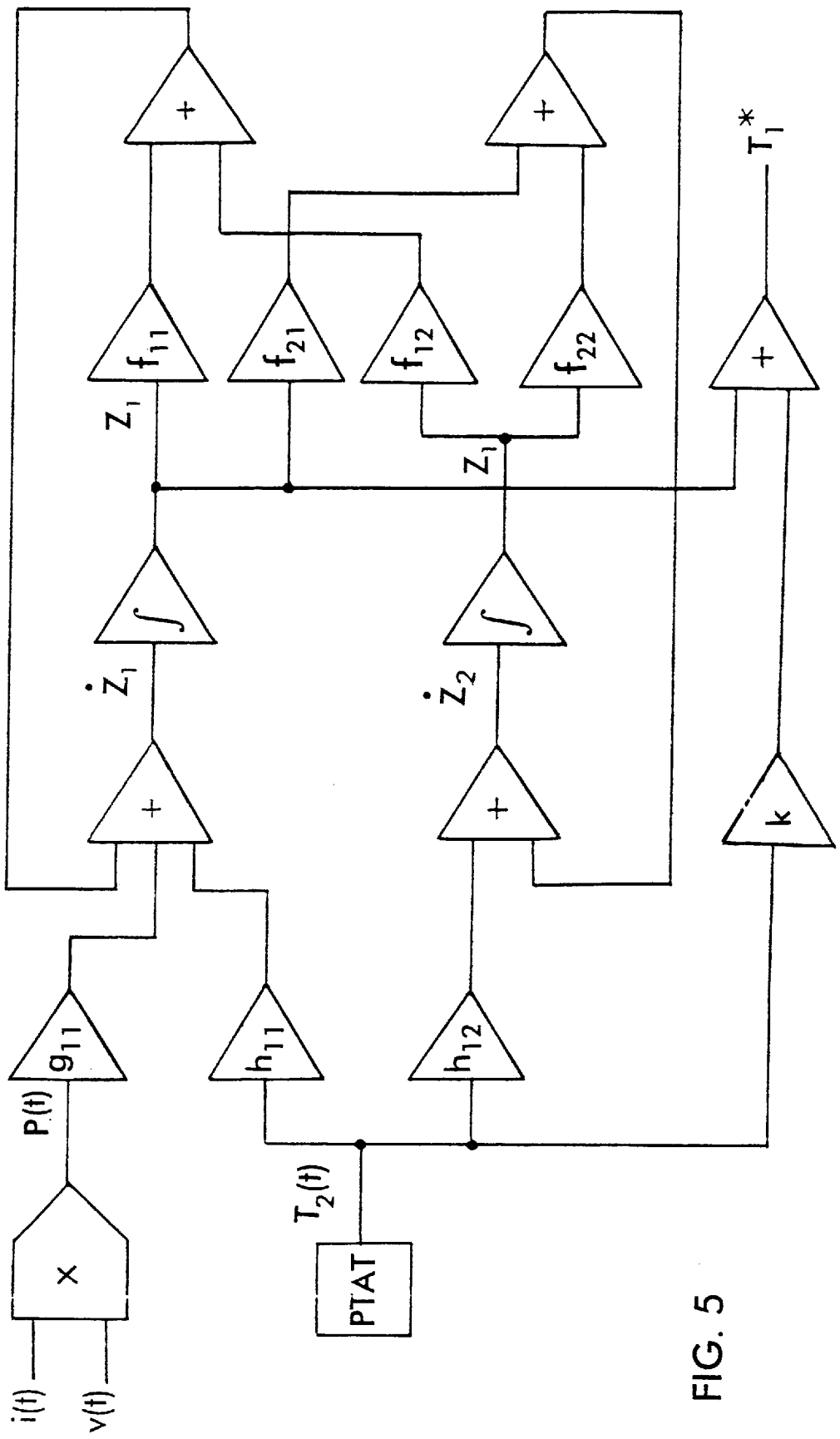
FIG. 5 shows an implementation of an asymptotic observer system according to FIG. 4 with coefficients for an actual packaging arrangement.

FIG. 5 shows a functional block diagram of an actual observer system to perform the function stated before and corresponding to FIGS. 1, 2 and 4. The blocks required are multipliers, amplifiers, summers and integrators that can be easily implemented with established technologies. The $f_{ij}$, $g_{ij}$ and $h_{ij}$ as well as constant k were determined based on the various known parameters as described above with respect to equations (1).

In FIG. 5, the coefficients F, G and H and constant K are taken from an actual implementation, where $$g_{11}=b=25$$

$$h_{11}=7.6\times10^5$$

$$h_{12}=-6\times10^6$$

$$f_{11}=3.77\times10^4$$

$$f_{21}=-3\times10^5$$

$$f_{12}=5.4\times10^3$$

$$f_{22}=-4.3\times10^4 \text{ and}$$

$$K=-151.$$

These coefficients are determined based on the parameters of equations (1) above, in particular $C_{10}$, $C_{20}$, $\theta_{12}$, $\theta_{13}$, $\theta_{23}$ and $T_3$. (Since $\dot{T}_3=0$, $T_3$ has been assumed constant). These parameters are as follows for an actual packaging arrangement as shown in FIG. 1:

$$C_{10}=40\times10^{-3} \text{ K/J}$$

$$C_{20}=8\times10^{-3} \text{ K/J}$$

$$\theta_{12}=0.5 \text{ K/w}$$

$$\theta_{13}=3 \text{ K/w}$$

$$\theta_{23}=3.5 \text{ K/w}$$

$$T_3=300$$

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for determining the temperature of a discrete power semiconductor from an analog integrated circuit that is copackaged with the power semiconductor on a heat sink, given a knowledge of the thermal capacitance of the power semiconductor and of the analog integrated circuit, the thermal resistance between the power semiconductor and the analog integrated circuit, the thermal resistance between the power semiconductor and the heat sink and the thermal resistance between the analog integrated circuit and the heat sink, the method comprising:

determining the voltage across the power semiconductor and the current through the power semiconductor, thereby determining the power dissipated in the power semiconductor;

determining the temperature of the analog integrated circuit;

determining the heat sink temperature;

using said thermal capacitances, heat sink temperature and thermal resistances to set coefficients of an asymptotic observer system;

providing said voltage and current and the temperature of the analog integrated circuit to the asymptotic observer system; and providing as an output from said asymptotic observer system said temperature of the discrete power semiconductor.

2. The method recited in claim 1, further comprising using said coefficients as gain factors of amplifiers of said asymptotic observer system and wherein said step of providing as an output comprises the step of integrating a signal in said asymptotic observer system that is proportional to the time derivative of the temperature of said power semiconductor to provide an integrated signal.

3. The method recited in claim 2, further comprising adding to said integrated signal a signal proportional to the temperature of the analog integrated circuit.

4. The method recited in claim 2 wherein said signal proportional to the time derivative of the temperature of the power semiconductor comprises a signal having components proportional to said power, said temperature of the analog integrated circuit and the temperature of said power semiconductor.

5. Apparatus for determining the temperature of a discrete power semiconductor from an analog integrated circuit that is copackaged with the power semiconductor on a heat sink, given knowledge of thermal capacitances of the power semiconductor and of the analog integrated circuit, the heat sink temperature, thermal resistance between the power semiconductor and the analog integrated circuit, thermal resistance between the power semiconductor and the heat sink and thermal resistance between the analog integrated circuit and the heat sink, the apparatus comprising:

a circuit having as inputs the voltage across the power semiconductor and the current through the power semiconductor and determining the power dissipated in the power semiconductor;

a circuit for determining the temperature of the analog integrated circuit; and an asymptotic observer system having coefficients formed from said thermal capacitances, ambient temperature and thermal resistances;

said asymptotic observe system having as inputs said voltage and current and the temperature of the analog integrated circuit and having as an output said temperature of the discrete power semiconductor.

6. The apparatus recited in claim 5, further wherein said coefficients of said asymptotic observer system comprises gain factors of amplifiers and wherein said asymptotic observer system comprises an integrator for integrating a signal that is proportional to the time derivative of the temperature of said power semiconductor to provide an integrated signal.

7. The apparatus recited in claim 6, further comprising an adder for adding a signal proportional to the temperature of the analog integrated circuit to said integrated signal.

8. The apparatus recited in claim 6, wherein said signal proportional to the time derivative of the temperature of the power semiconductor comprises a signal having components proportional to said power, said temperature of the analog integrated circuit and the temperature of said power semiconductor.

9. The apparatus recited in claim 5, wherein the asymptotic observer system includes a variable transconductance multiplier for determining the power dissipated in the power semiconductor from said voltage and current.

10. The apparatus recited in claim 5, wherein the circuit for determining the temperature of the analog integrated circuit comprises a proportional to absolute temperature (PTAT) circuit.

11. A method for determining the steady state temperature of a discrete power semiconductor device using an analog integrated circuit that is co-packaged with the power semiconductor device on a heat sink, given knowledge of the thermal resistance between the power semiconductor device and the analog integrated circuit, the thermal resistance between the power semiconductor device and the heat sink and the thermal resistance between the analog integrated circuit and the heat sink, the method comprising:

determining the voltage across the power semiconductor device and the current through the power semiconductor device, thereby determining the power dissipated in the power semiconductor device;

determining the temperature of the analog integrated circuit;

determining the heat sink temperature; and using said heat sink temperature, the power dissipated in the power semiconductor device, the temperature of the analog integrated circuit and the thermal resistances between the power semiconductor device and the analog integrated circuit, between the power semiconductor device and the heat sink, and between the analog integrated circuit and the heat sink to determine the temperature of the discrete power semiconductor device.

12. Apparatus for determining the steady state temperature of a discrete power semiconductor device using an analog integrated circuit that is co-packaged with the power semiconductor on a heat sink, given knowledge of the heat sink temperature and thermal resistance between the power semiconductor device and the analog integrated circuit, thermal resistance between the power semiconductor device and the heat sink and thermal resistance between the analog integrated circuit and the heat sink, the apparatus comprising:

a circuit having as inputs the voltage across the power semiconductor device and the current through the power semiconductor device for determining the power dissipated in the power semiconductor device;

a circuit for determining the temperature of the analog integrated circuit; and a circuit heat said sink temperature, the power dissipated in the power semiconductor device, the temperature of the analog integrated circuit and the thermal resistances between the power semiconductor device and the analog integrated circuit, between the power semiconductor device and the heat sink, and between the analog integrated circuit and the heat sink to calculate as an output, the temperature of the discrete power semiconductor device.

13. Apparatus for determining the temperature of a discrete power semiconductor from an analog integrated circuit that is copackaged with the power semiconductor on a heat sink, given knowledge of thermal capacitances of the power semiconductor and of the analog integrated circuit, the heat sink temperature, thermal resistance between the power semiconductor and the analog integrated circuit, thermal resistance between the power semiconductor and the heat sink and thermal resistance between the analog integrated circuit and the heat sink, the apparatus comprising:

means using the voltage across the power semiconductor and the current through the power semiconductor for determining the power dissipated in the power semiconductor;

means for determining the temperature of the analog integrated circuit; and an asymptotic observer system having coefficients formed from said thermal capacitances, ambient temperature and thermal resistances;

said asymptotic observe system having as inputs said voltage and current and the temperature of the analog integrated circuit and having as an output said temperature of the discrete power semiconductor.

14. The apparatus recited in claim 13, further wherein said coefficients of said asymptotic observer system comprises gain factors of amplifiers and wherein said asymptotic observer system comprises an integrator for integrating a signal that is proportional to the time derivative of the temperature of said power semiconductor to provide an integrated signal.

15. The apparatus recited in claim 14, further comprising an adder for adding a signal proportional to the temperature of the analog integrated circuit to said integrated signal.

16. The apparatus recited in claim 14, wherein said signal proportional to the time derivative of the temperature of the power semiconductor comprises a signal having components proportional to said power, said temperature of the analog integrated circuit and the temperature of said power semiconductor.

17. The apparatus recited in claim 13, wherein the asymptotic observer system includes a variable transconductance multiplier for determining the power dissipated in the power semiconductor from said voltage and current.

18. The apparatus recited in claim 13, wherein the means for determining the temperature of the analog integrated circuit comprises a proportional to absolute temperature (PTAT) circuit.

19. Apparatus for determining the steady state temperature of a discrete power semiconductor device using an analog integrated circuit that is co-packaged with the power semiconductor device on a heat sink, given knowledge of the heat sink temperature and thermal resistance between the power semiconductor device and the analog integrated circuit, thermal resistance between the power semiconductor device and the heat sink and thermal resistance between the analog integrated circuit and the heat sink, the apparatus comprising:

means using the voltage across the power semiconductor device and the current through the power semiconductor device to determine the power dissipated in the power semiconductor device;

means determining the temperature of the analog integrated circuit; and means using said heat sink temperature, the power dissipated in the power semiconductor device, the temperature of the analog integrated circuit and the thermal resistances between the power semiconductor device and the analog integrated circuit. between the power semiconductor device and the heat sink, and between the analog integrated circuit and the heat sink to calculate as an output, the temperature of the discrete power semiconductor device.

\* \* \* \* \*